US012808078B2

United States Patent

Pourpoint et al.

(10) Patent No.: US 12,808,078 B2
(45) Date of Patent: Nov. 24, 2026

(54) APPARATUSES AND METHODS FOR CREATING WETTING CONTROLLING MICROFEATURES

(71) Applicant: PURDUE RESEARCH FOUNDATION, West Lafayette, IN (US)

(72) Inventors: Timothee L. Pourpoint, West Lafayette, IN (US); Blair N. Francis, Bargersville, IN (US); John Wood Ellis, Ridgecrest, CA (US); Michael Shaw Titus, West Lafayette, IN (US); Benjamin Paul Smith, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 624 days.

(21) Appl. No.: 18/465,956

(22) Filed: Sep. 12, 2023

(65) Prior Publication Data

US 2024/0084475 A1 Mar. 14, 2024

Related U.S. Application Data

(60) Provisional application No. 63/405,672, filed on Sep. 12, 2022.

(51) Int. Cl.
*C25F 3/02* (2006.01)
*C21D 6/00* (2006.01)
(Continued)

(52) U.S. Cl.
CPC .................. *C25F 3/02* (2013.01); *C21D 6/00* (2013.01); *C21D 11/00* (2013.01); *C25F 3/06* (2013.01); *G01N 27/00* (2013.01)

(58) Field of Classification Search
CPC ..................................... C25F 3/02; C25F 3/06
See application file for complete search history.

(56) References Cited

U.S. PATENT DOCUMENTS 3,660,249 A * 5/1972 Townsend .............. G01N 17/02
324/71.2

OTHER PUBLICATIONS

Kangnan Fan, et al; "A facile electrochemical machining process to fabricate superhydrophobic surface on iron materials and its applications in anti-icing", Journal of Dispersion Science and Technology, 2021, vol. 42, No. 3, pp. 457-464; Published online: Oct. 22, 2019.

(Continued)

*Primary Examiner* — Brian W Cohen

(57) ABSTRACT

Apparatuses and methods for creating phobic and philic surfaces (for example, superphobic and superphilic surfaces) are disclosed. Embodiments include methods for determining a heat treatment technique that increases the likelihood that a uniformly etched surface with minimal pitting will be formed when the surface of a material is subject to etching. Additional embodiments include evaluating the PRE number of the material, performing an anodic polarization sweep of the material, evaluating the polarization curve (current vs. potential) for the material, performing different etching protocols depending on the range of values the PRE number of the material belongs, and/or pulsing the current applied to the material during the etching process. Additional embodiments include apparatuses and methods for predictably etching a surface (such as a surface of a metal alloy) of a material, which can include etching interior portions of a hollow work piece.

14 Claims, 11 Drawing Sheets

(51) Int. Cl.
*C21D 11/00* (2006.01)
*C25F 3/06* (2006.01)
*G01N 27/00* (2006.01)

(56) References Cited

OTHER PUBLICATIONS

Ning Ma, et al; "A simple, inexpensive and environmental-friendly electrochemical etching method to fabricate superhydrophobic GH4169 surfaces", Journal Surface & Coatings Technology, 2020 Available online Jul. 10, 2020; 10 pages.

Jing Sun, et al; "Electrochemical fabrication of superhydrophobic Zn surfaces", Applied Surface Science 315 (2014) pp. 346-352; Available online Aug. 1, 2014.

Jin-Long Song, et al; "Electrochemical machining of superhydrophobic Al surfaces and effect of processing parameters on wettability", Appl Phys A (2012) 108: 559-568; Published online: Apr. 25, 2012.

Baitai Qian, et al; "Fabrication of Superhydrophobic Surfaces by Dislocation-Selective Chemical Etching on Aluminum, Copper, and Zinc Substrates", Langmuir vol. 21, No. 20, Aug. 31, 2005, 21, 9007-9009.

Jinlong Song, et al; "One-step electrochemical machining of superhydrophobic surfaces on aluminum substrates", J. Mater Sci (2012) 47:162-168.

Tiziano Bellezze, et al; "Study of stainless steels corrosion in a strong acid mixture. Part 1: cyclic potentiodynamic polarization curves examined by means of an analytical method", Corrosion Science 130 Jan. 2018; 113-115.

A.G. Hartline, III; "The Effect of Nitrogen Additions Upon the Pitting Resistance of 18 PCT Cr, 18 Pct Mn Stainless Steel", Metallurgical Transactions, vol. 5, Published Nov. 1, 1974; pp. 2271-2276.

J.H. Cleland; "What Does The Pitting Resistance Equivalent Really Tell US?", Engineering Failure Analysis, vol. 3, No. 1, pp. 65-69, Mar. 1996.

* cited by examiner

Relaxation Period – Flow of Electrolyte desaturates the pit and allows regrowth of passive layer Relaxation Period (Current is off)

Initial Attack (Applied Current) - Active Dissolution of Metal

Relaxation Period (Current is off)

Re-applied Current – Re-randomized pit initiation

APPARATUSES AND METHODS FOR CREATING WETTING CONTROLLING MICROFEATURES

This application claims the benefit of U.S. Provisional Application No. 63/405,672, filed 12 Sep. 2022, the entirety of which is hereby incorporated herein by reference.

FIELD

Embodiments of this disclosure relate generally to creating metal alloys with phobic and/or philic surfaces, such as surfaces that are superphobic and/or superphilic for a particular liquid.

BACKGROUND

A superphobic surface is a surface that exhibits a strong resistance to a fluid wetting the surface (sometimes referred to as a strong repulsion to a fluid) and is generally considered to be a surface that when exposed to a fluid exhibits a contact angle (CA, the angle between the surface and the liquid) that is at least 150 degrees and a contact angle hysteresis of less than 5 degrees. Superphobic surfaces typically are constructed of a surface material that exhibits some degree of phobicity that is roughened. If the combination of the natural phobicity of the material and the roughness are properly controlled, then a superphobic surface can result. Advantages of superphobic surfaces include anti-corrosive, anti-icing, anti-drag, anti-sticking, hydrodynamic drag reduction, self-cleaning, condensation enhancement, evaporation reduction and blood repellency.

A superphilic surface is a surface that exhibits a strong attraction to a fluid and is generally considered to be a surface that when exposed to a fluid exhibits a contact angle (CA, the angle between the surface and the liquid) that is at most five (5) degrees. Advantages of superphilic surfaces include the ability to defog glass, and enable oil spots to be swept away easily with water.

Superphobic and superphilic surfaces have the potential for widespread applications including fluid drag reduction, corrosion resistance, water-oil separation, anti-icing, passive liquid transport, and enhanced critical heat flux in pool boiling.

Electrochemistry has been used in various surface treatments for alloys including electropolishing, electrodeposition, passivation, etching, and microscale machining. While the principles of electrochemistry are well understood, the multiscale and complex nature of the reactions make it difficult to predict how a given alloy will respond to an electrochemical treatment (current density, time, current frequency, solution composition, temperature, etc.). Consequently, there is a need for a systematic workflow that enables users to obtain a desired surface from electrochemical treatments.

It was realized by the inventors of the current disclosure that problems exist with current methods and apparatuses for creating wetting controlling microfeatures and that improvements are needed.

Certain preferred features of the present disclosure address these and other needs and provide other important advantages.

SUMMARY

Embodiments of the present disclosure provide improved electrochemical techniques for producing wetting controlling microfeatures including techniques to predictably create superphobic and/or superphilic surfaces on materials, such as metal alloys.

In accordance with aspects of embodiments of the present disclosure, a framework for identifying electrochemical etches on various alloys that produce highly dense microfeatures and/or nano-features needed to enable superphobic and/or superphilic behavior of liquids use an electrolyte solution, e.g., a simple nontoxic electrolyte solution. Using this framework, recipes that produce superhydrophobic and oleophobic surfaces on various metals, e.g., Ni Alloy 718, SS304, Haynes® 282®, Ni Alloy 625, and Ni Alloy 600, have been developed. Phobic surfaces (which include oleophobic and hydrophobic surfaces) can advantageously reduce fouling in engines by minimizing contact area between a fuel and wetted surface and reducing thermal loading. This technology potentially enables several new products including propellant management vanes for spacecraft with enhanced passive flow control, fouling resistant fuel systems and nozzles, drip resistant injectors for rocket engines, etc.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a feature unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1A:
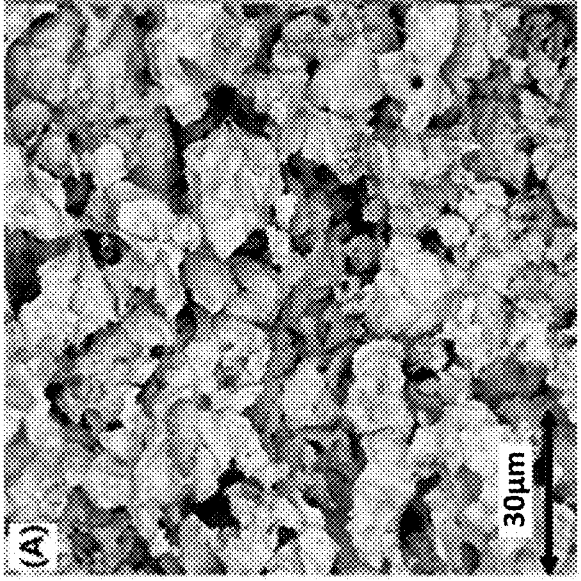
FIG. 1A depicts Ni Alloy 718 electrochemically etched under specified conditions.

For the purposes of promoting an understanding of the principles of the disclosure, reference will now be made to one or more embodiments, which may or may not be illustrated in the drawings, and specific language will be used to describe the same. It will nevertheless be understood that no feature of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" that may occur within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

A phobic surface is a surface that resists wetting by a liquid, and a process that increases the phobicity of a material decreases the manner in which a liquid interacts with the surface of the material. Types of phobic surfaces include hydrophobic (resists wetting by water), oleophobic (resists wetting by oil), superphobic (highly resistant to wetting), superhydrophobic (highly resistant to wetting by water) and superoleophobic (highly resistant to wetting by oil).

A philic surface is a surface that is conducive to wetting by a liquid, and a process that increases the philicity of a material increases the manner in which a liquid interacts with the surface of the material. Types of philic surfaces include hydrophilic (conducive to wetting by water), oleophilic (conducive to wetting by oil), superphilic (highly conducive to wetting by a liquid), superhydrophilic (highly conducive to wetting by water) and superoleophilic (highly conducive to wetting by oil).

A substantial percentage of superphobic and superphilic surfaces are made possible by isotropic (e.g., uniform) microscale roughness on the wetting surface. When there is weak liquid-solid interfacial tension, the roughness can induce the superphobic lotus effect (named after what occurs to water when on a leaf of a lotus plant) which results in droplets beading up and rolling off the surface rather than wetting (e.g., spreading across) the surface. Effectively, the liquid only contacts the peaks of the surface roughness features trapping inert gas or vapor pockets underneath in the valleys between the peaks of the surface roughness features. When the liquid-solid interfacial tension is stronger, the liquid has a higher affinity to wet (e.g., spread across) the surface at the microscale resulting in a strong wicking effect. Therefore, creating these surfaces can include two principal steps: (1) micro and/or nano scale roughening, and (2) reducing the interfacial tension.

Reducing the interfacial tension can be accomplished by applying various off-the-shelf products that produce self-assembling monolayers without affecting the microscale topology of the etched material. Idealized microscale roughness has been accomplished using a variety of methods. It was recognized by the inventors of the present disclosure that each of the known techniques have benefits and drawbacks. For example, femto-second laser engraving and lithography produce ordered and consistent surface finishes, but are limited in scalability and line-of-sight. Sol-Gel and other deposition techniques typically introduce a coating or particles that may not have the same durability or chemical compatibility as the underlying substrate. It may also be difficult or impossible to apply a uniform treatment within complex or enclosed passageways with these techniques.

The inventors of the present disclosure realized that electrochemical etching does not suffer from these difficulties and that electrochemical etching can be applied to a wide variety of metals or electrically conductive surfaces. Since electrochemical etching is a reductive process, the microfeatures generally have the same composition as the underlying material, which reduces (if not eliminates) concerns regarding chemical compatibility and adhesion durability that would be present for a coating or deposition. While frequently limited to microscale features, electrochemical etching can produce nanoscale features on specific materials. With techniques developed by the inventors of the present disclosure, it is also possible to etch enclosed geometries with electrochemical etching.

A significant challenge in forming superphobic and superphilic surfaces is creating idealized microfeatures when roughening the surface. The geometry, scale, and distribution of features all play a role in wetting mechanics. Capillary forces weaken as an inverse of scale. This means the surface tension keeping the liquid along the peaks of features weakens as the features grow in scale and farther apart. Similarly, the wicking effect grows weaker as the roughened wetting area grows farther apart. This can be characterized with the nondimensional Bond number representing the ratio of weight due to gravity relative to capillary force. Table 1 contains the bond number for various liquids with different surface tensions at different characteristic length scales under standard gravitational acceleration (9.81 m/s$^2$). Features typically need to be sub-millimeter scale to even show a significant impact on wetting for any liquid, and need to be micron scale for superphobic surfaces to be stable against perturbations. Therefore, super oleophobic surfaces (surfaces that resist wetting from oils) are more difficult to accomplish since oils typically have weak surface tension. Weaker surface tensions mean that even weak liquid-solid interfacial tensions can often overtake the surface tension resulting in wetting instead of beading up into a sphere.

TABLE 1

Bond Numbers

| Characteristic Length | Liquid (Surface Tension (dyne/cm)) Water (70.5) | Glycerin (67.3) | Mobil Jet 2 (34.2) | JP-8 (20.2) |
|---|---|---|---|---|
| 1 cm | 14 | 18 | 29 | 39 |
| 0.1 cm | 0.14 | 0.18 | 0.29 | 0.39 |
| 0.01 cm | 0.0014 | 0.0018 | 0.0029 | 0.0039 |

Fundamentally, an electrochemical etch provides roughness through anodic dissolution of the work piece. An electric power supply is attached to the work piece and a counter electrode to provide the overpotential necessary to drive the surface reactions. While any electrically conductive material can theoretically be etched using electrochemistry, predicting the resulting etching pattern and resulting topology is extremely challenging. The rate of reaction depends on various factors including, for example, the composition on the surface, diffusion rates, transport due to flow, and temperature. The multivariate and multiscale nature of electrochemistry makes it very difficult to model or predict. Hence, tailoring an etch to produce specific qualities remains an extremely challenging endeavor.

Figure 1B:
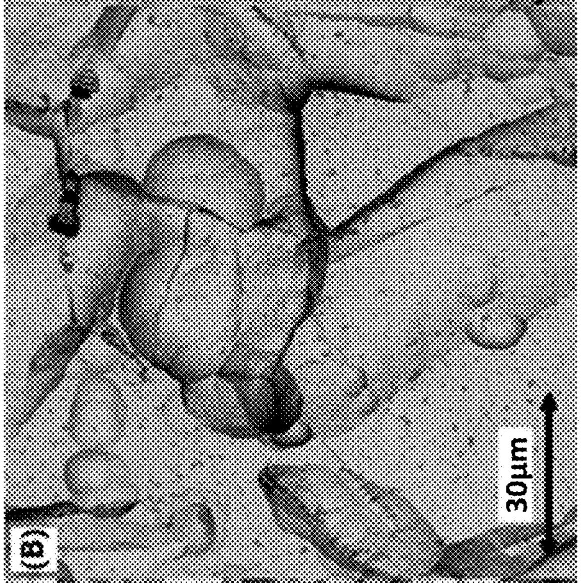
FIG. 1B depicts Haynes 282 electrochemically etched under the same specified conditions as used for the etching in FIG. 1A.
Figure 1C:
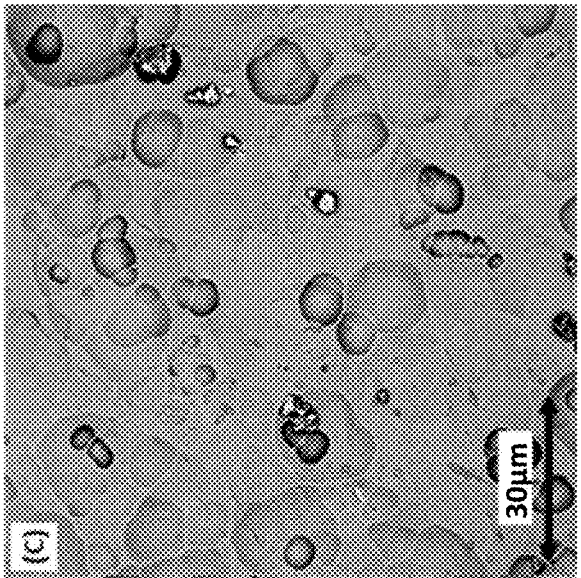
FIG. 1C depicts Ni Alloy 625 electrochemically etched under the same specified conditions as used for the etching in FIG. 1A.
Figure 10:
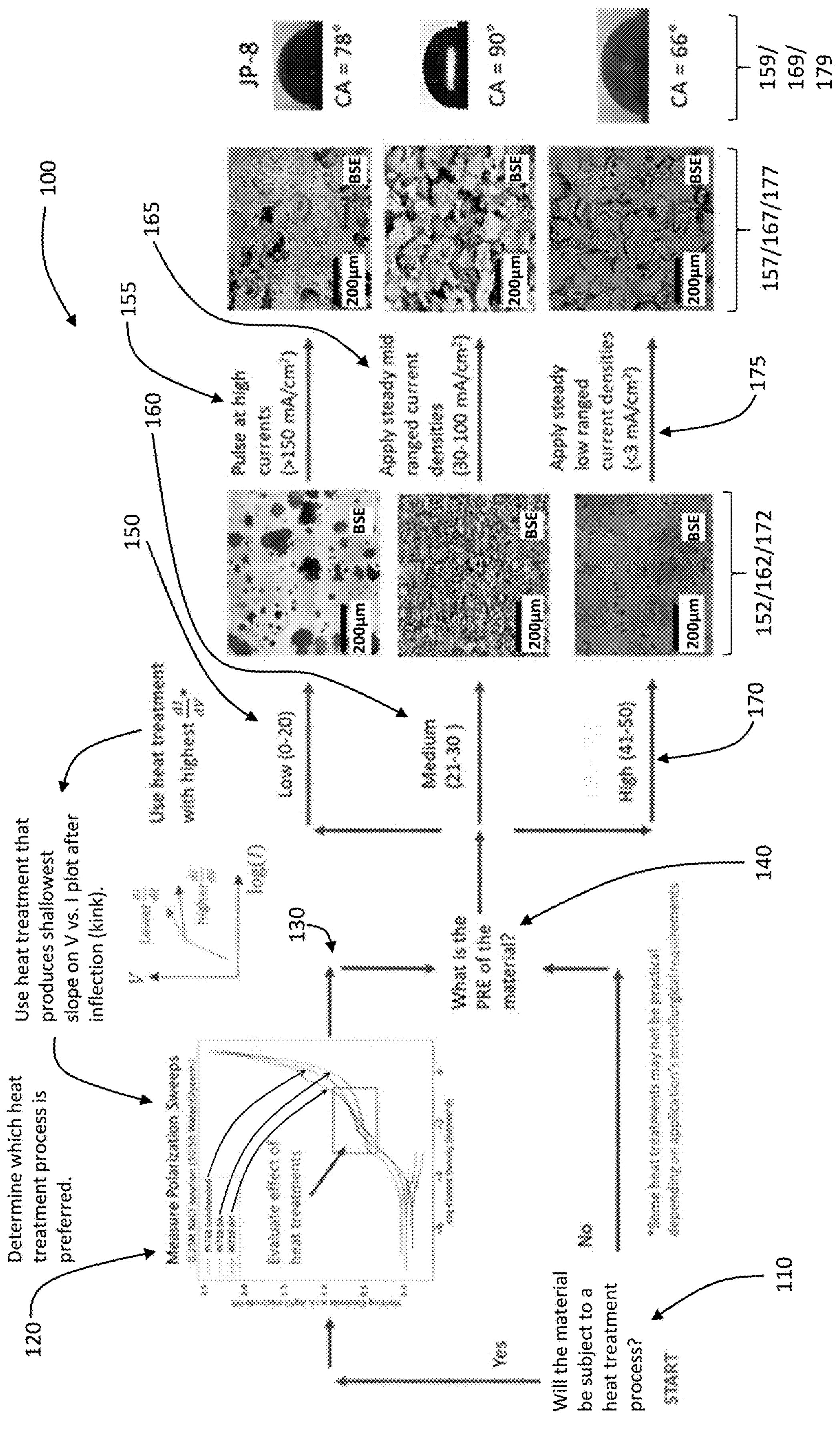
FIG. 10 depicts a process flow path for etching a material according to embodiments of the present disclosure.

Developing an electrochemical etch that consistently results in superphobic microfeatures is highly unpredictable. Reasons for this unpredictability include the common occurrence of two materials with similar compositions and properties having dramatically different etch topologies after being etched with the same etching "recipe." For example, FIGS. 1A-1C depict three similar materials that have been etched with the same electrochemical process. FIG. 1A depicts a small section (approximately 100 μm by 100 μm) of the surface features of Ni Alloy 718. FIG. 1B depicts a small section (approximately 100 μm by 100 μm) of the surface features of Haynes 282. And, FIG. 10 depicts a small section (approximately 100 μm by 100 μm) of the surface features of Ni Alloy 625. While all three materials are precipitation hardened nickel-chromium alloys, there are dramatic differences in their etching behavior as evidenced by the close-up views of their surfaces.

In an early attempt to characterize different material's resistance to corrosion and pitting, a non-dimensional pitting resistance equivalence number (PRE) was developed after discovering a correlation between the weight percentage of specific elements (e.g., chromium and molybdenum) and the open circuit potential. There are numerous formulations for the PRE depending on the material family. Equation 1 is a formula useful for ferritic alloys, which emphasizes the effect of molybdenum and chromium:

$$PRE=Cr+(3.3*Mo)+(16*N)+(0.5*W) \quad \text{Equation 1}$$

where Cr is the percentage by weight of chromium in the material (e.g., the metal alloy being treated/etched), Mo is the percentage by weight of molybdenum in the material, N is the percentage by weight of nitrogen in the material, and W is the percentage by weight of tungsten in the material. As can be seen from Equation 1, the existence of nitrogen (N) in the material has a large impact on the PRE while the existence of tungsten (W) has a small effect.

Materials with higher open circuit potentials are generally more resilient to electrochemical attack. This means the PRE provides a primitive relationship between composition and the resulting etch behavior. PRE can indicate how likely it is for pitting and grain boundary attacks to occur on a surface of a material being etched.

Figure 7:
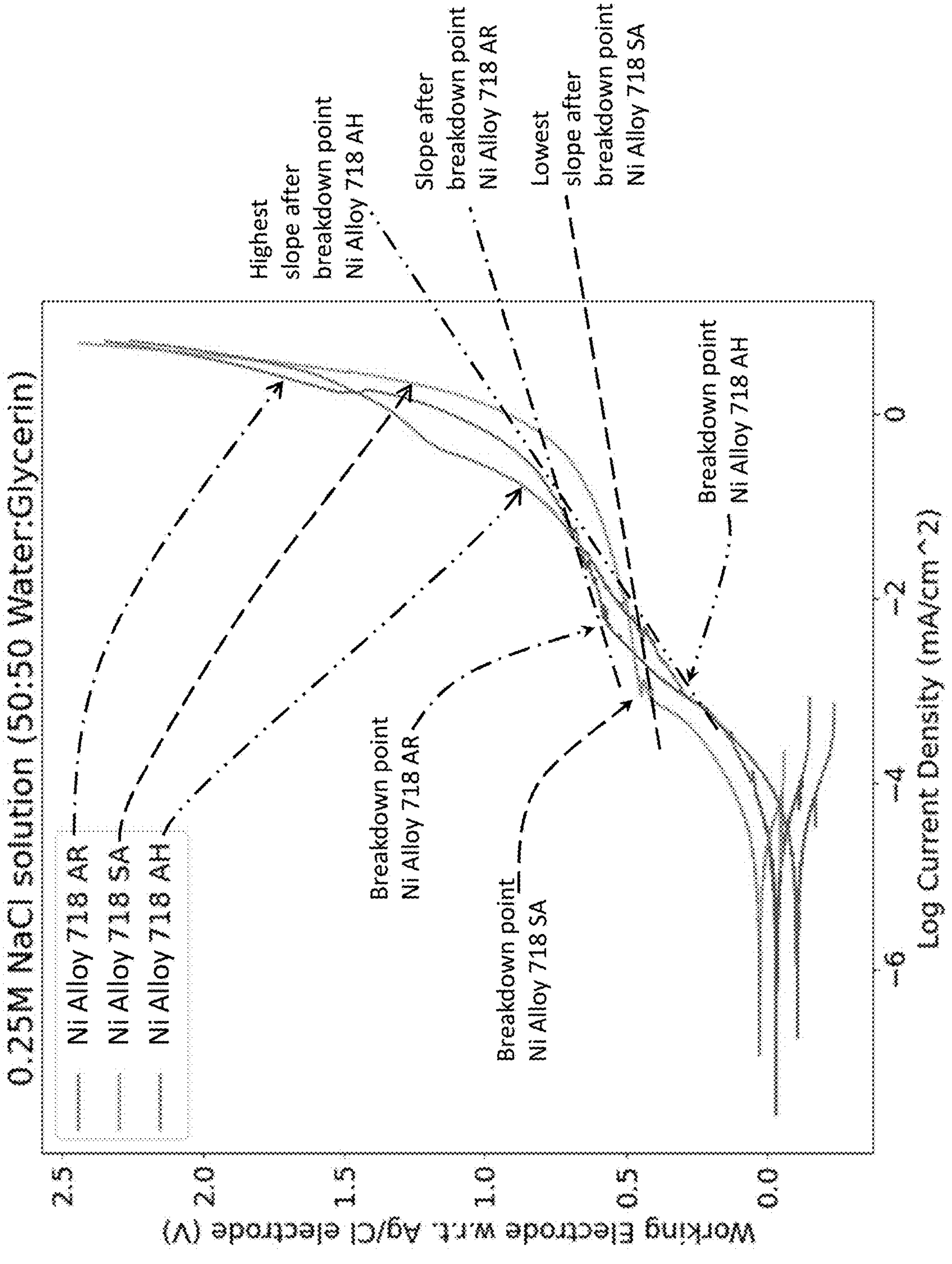
FIG. 7 depicts the polarization curves for different heat treatments of Ni Alloy 718.

An anodic polarization sweep (an example of which is depicted in FIG. 7) is produced by increasing (e.g., linearly) the anodic overpotential on a work piece that is submersed in an etching solution and measuring the net electrical current leaving the sample. The resulting trace of current vs. potential (typically referred to as the polarization curve) can vary significantly depending on the material, but nevertheless frequently contains the following features: the open circuit potential where the net current is near zero and the reactions transition from cathodic to anodic reactions, and the pitting ("breakdown") potential where the current abruptly increases with potential.

The open circuit potential can infer the PRE of the material even if the composition is unknown. Microfeatures and pits do not form at potentials below the pitting potential. At potentials above the pitting potential, more aggressive attacks on the material occur (such as pitting and grain boundary attacks) resulting in an increased anodic current. It was determined by the inventors of the present disclosure that the rate at which the current increases with potential (i.e., the slope of dI/dV) above the pitting potential has significant implications on the nature of the reactions occurring on the surface. Example implications are that the surface has more area or sites favoring reaction, or that the reaction is more aggressive with the same amount of area.

Figure 2:
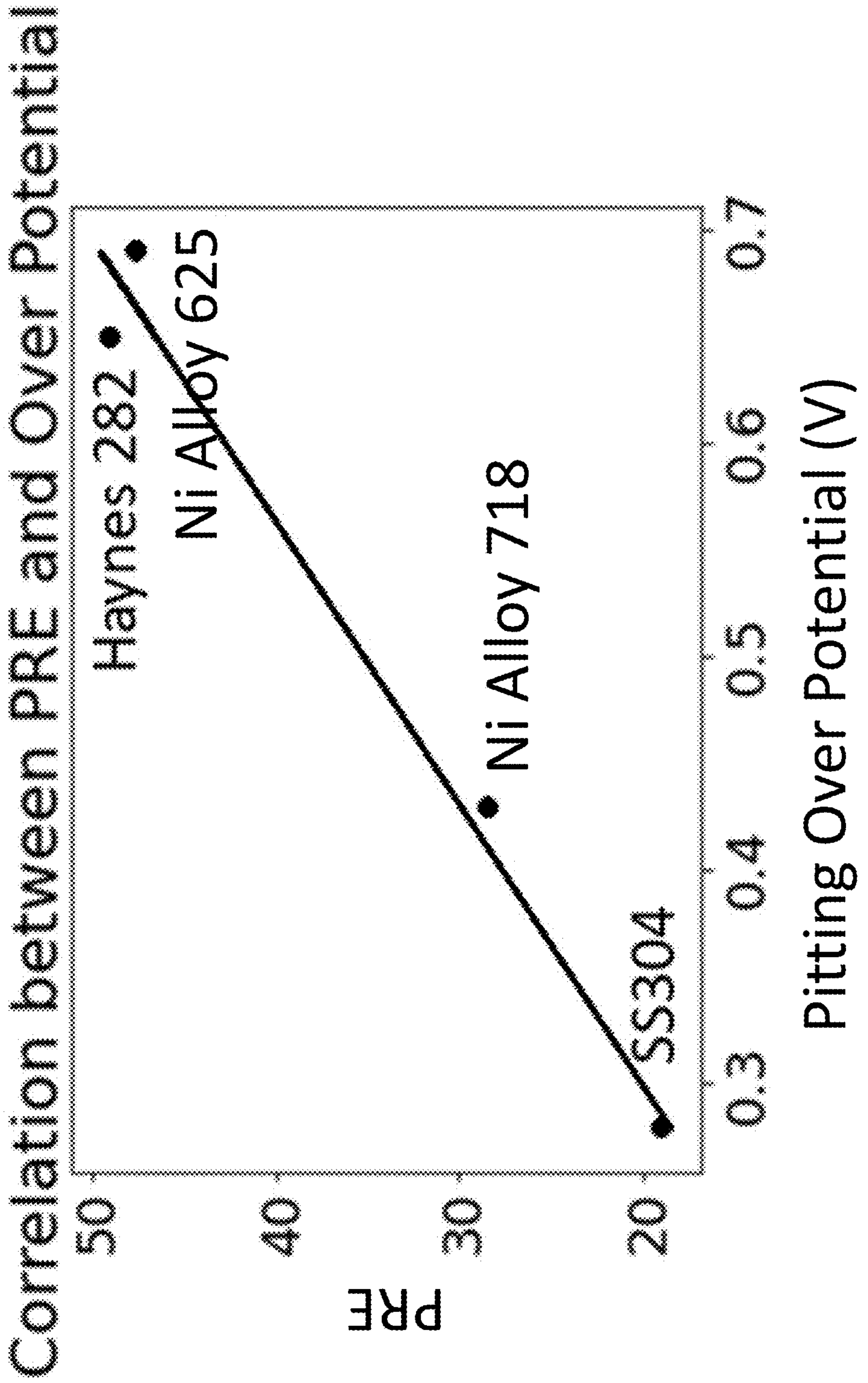
FIG. 2 depicts non-dimensional pitting resistance equivalence number (PRE) vs. pitting overpotential for various alloys in a standard electrolyte solution.

FIG. 2 depicts a linear correlation between PRE and pitting over potential. Pitting over potential is the pitting potential relative to the open circuit potential of that material. The PRE values in FIG. 2 were calculated using Equation 1 and the pitting over potential identified using polarization curves obtained in a "standard solution" consisting of 0.25 molar sodium chloride in 50:50 water to glycerol ratio by volume.

A "standard etch" is defined as the etching recipe that first produced superhydrophobic and oleophobic capable microfeatures on Ni Alloy 718. The standard etch is 30 mA/cm 2 of anodically applied current through the work piece in standard solution for 200 minutes. By applying the standard etch to different materials the inventors were able to directly compare the differences in behavior of the disparate materials and identify contributing factors. It was determined that the etching behavior followed a trend according to PRE.

Figure 3:
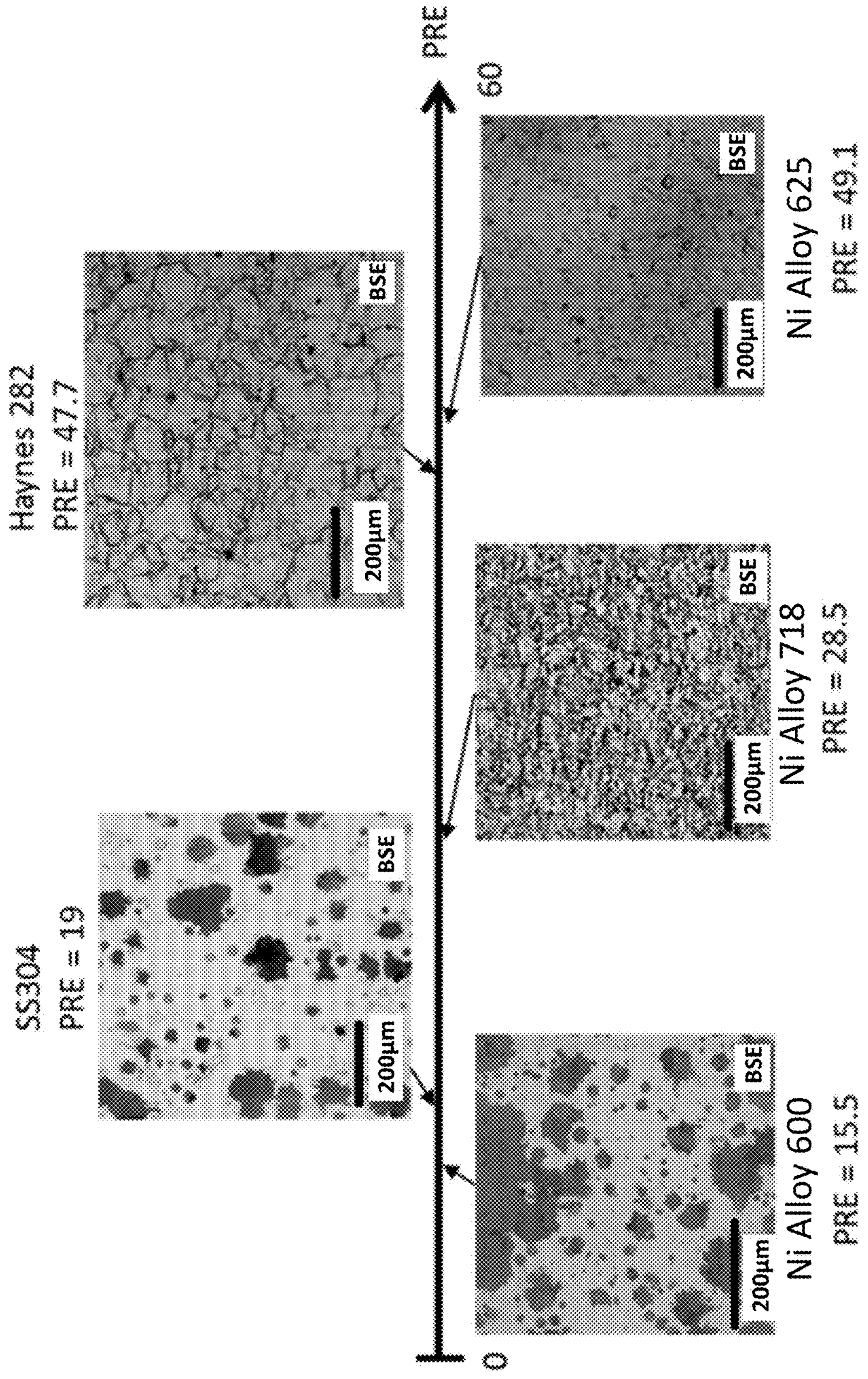
FIG. 3 depicts the surface topology from a standard etch and electrolyte solution for materials with varied PRE numbers.

FIG. 3 depicts the surface topology from a standard etch and electrolyte solution for materials with varied PRE numbers demonstrating that lower PRE materials tend toward highly localized pitting. FIG. 3 shows how pits transition from being small (microscale) and distributed across the surface at larger PRE (such as shown in FIG. 3 for Ni Alloy 625 with the highest example PRE at 49.1) to large sporadic pits larger than hundreds of microns wide for smaller PRE (such as shown in FIG. 3 for Ni Alloy 600 with the lowest example PRE of 15.5). The inventors hypothesize that in materials more resistant to pitting (i.e., materials with higher PRE), the pits tend to have shorter periods of growth before self-terminating, which can result in a more uniform and distributed etching attack on the material. In contrast, in materials that are less resistant to pitting (i.e., materials with lower PRE), the pits tend to sustain longer periods of growth, which can favor propagation of the pits instead of nucleating new attack sites.

Figure 4C:
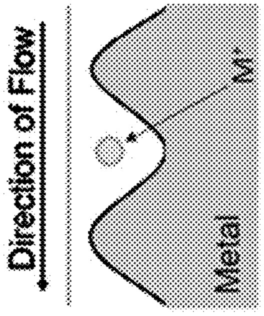
FIG. 4A-4E are illustrations of the surface of a metal during pulsing of an applied current.
Figure 4B:
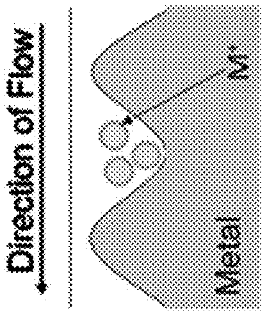
Figure 4A:
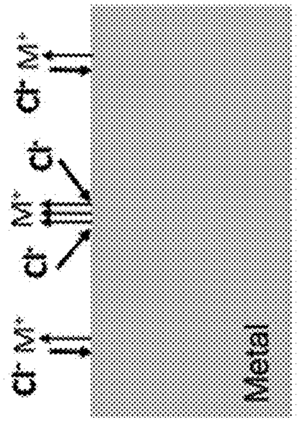
Figure 4E:
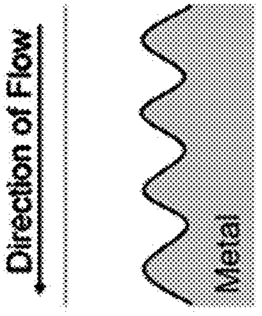
Figure 4D:
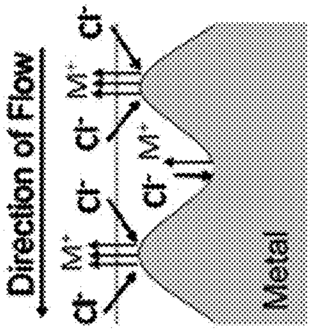

To improve uniformity, the inventors of the present disclosure pulsed the anodic current (turned the anodic current on and off) as a method of regularly "resetting" the surfaces with lower PRE values. Using this pulsing technique the surface can passivate (i.e., become less reactive) when the current is interrupted, thereby terminating pit growth. FIGS. 4A-4E depict how this phenomenon is believed to work and are illustrations of the surface of a metal during pulsing of an applied current enabling the repassivation and uniform distribution of microfeatures on the surface. FIG. 4A depicts the current being applied for the initial attack. FIG. 4B depicts the beginning of the relaxation period when the current is turned off. As the current remains off (FIG. 4C), the flow of electrolyte desaturases the pit and allows regrowth of the passive layer. FIG. 4D depicts the current being reapplied and the re-initiation of the randomized pitting. FIG. 4E depicts the current being turned off again to begin another relaxation period and the results of the pitting can be seen to have formed an increased number of peaks.

Figure 5A:
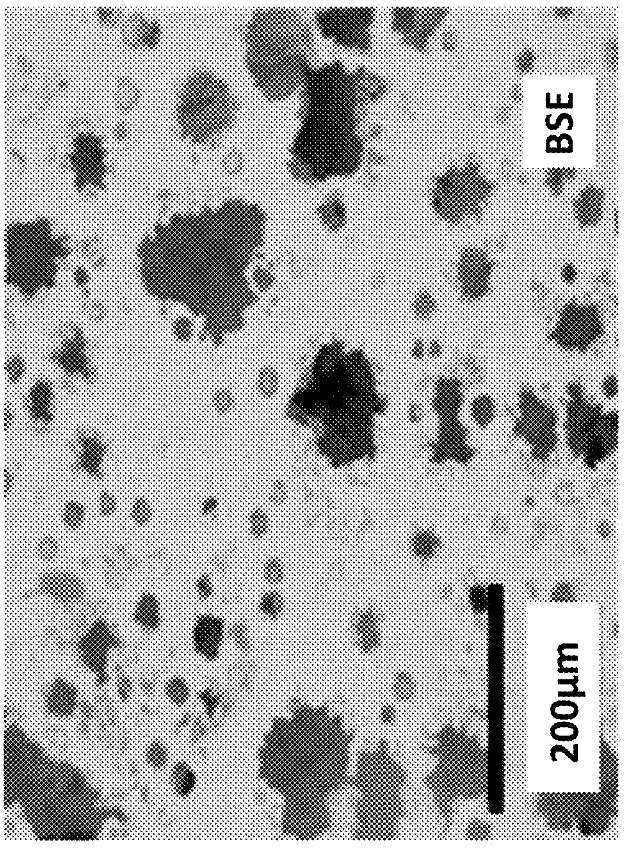
FIG. 5A depicts the topology of a standard etch on stainless steel utilizing a steady current.
Figure 5B:
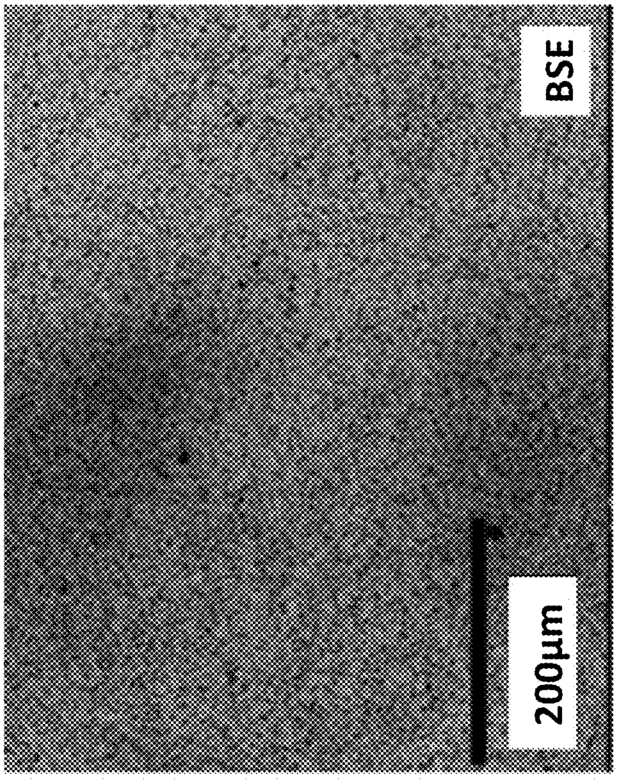
FIG. 5B depicts the topology of a standard etch on the same type of stainless steel as depicted in FIG. 5A utilizing a pulsed current.

Depicted in FIGS. 5A and 5B are similarly sized portions of stainless steel that have been subjected to etching with a steady current for a specified time (FIG. 5A) and etching with a current pulsed at 2 seconds on and 8 seconds off (FIG. 5B) until the total "on" time for the sample shown in FIG. 5B was equal to the time elapsed for FIG. 5A. The difference between steady current etching and pulsed current etching is most dramatic for materials with low PRE numbers that are highly susceptible to localized attack. Pulsing the current has much less effect on materials that are highly resistant to pitting (high PRE materials) such as Ni Alloy 625. The "BSE" in FIGS. 5A and 5B refers to the images having been produced using a backscatter electron detector (BSE).

Heat treatments may be applied to alloys to alter the internal microstructure and achieve desired strength and ductility properties. However, heat treatments change the granular structure and composition distribution at the microscale, which influences the etching behavior. Two pieces of material made from the same alloy with different heat treatments will have the same PRE since their overall chemical formulation is the same. Therefore, the rate of change of current density per unit potential dI/dV after the pitting point on the polarization curve (transpassive slope) can be used to communicate the effect of the heat treatment on etch behavior.

Figure 6:
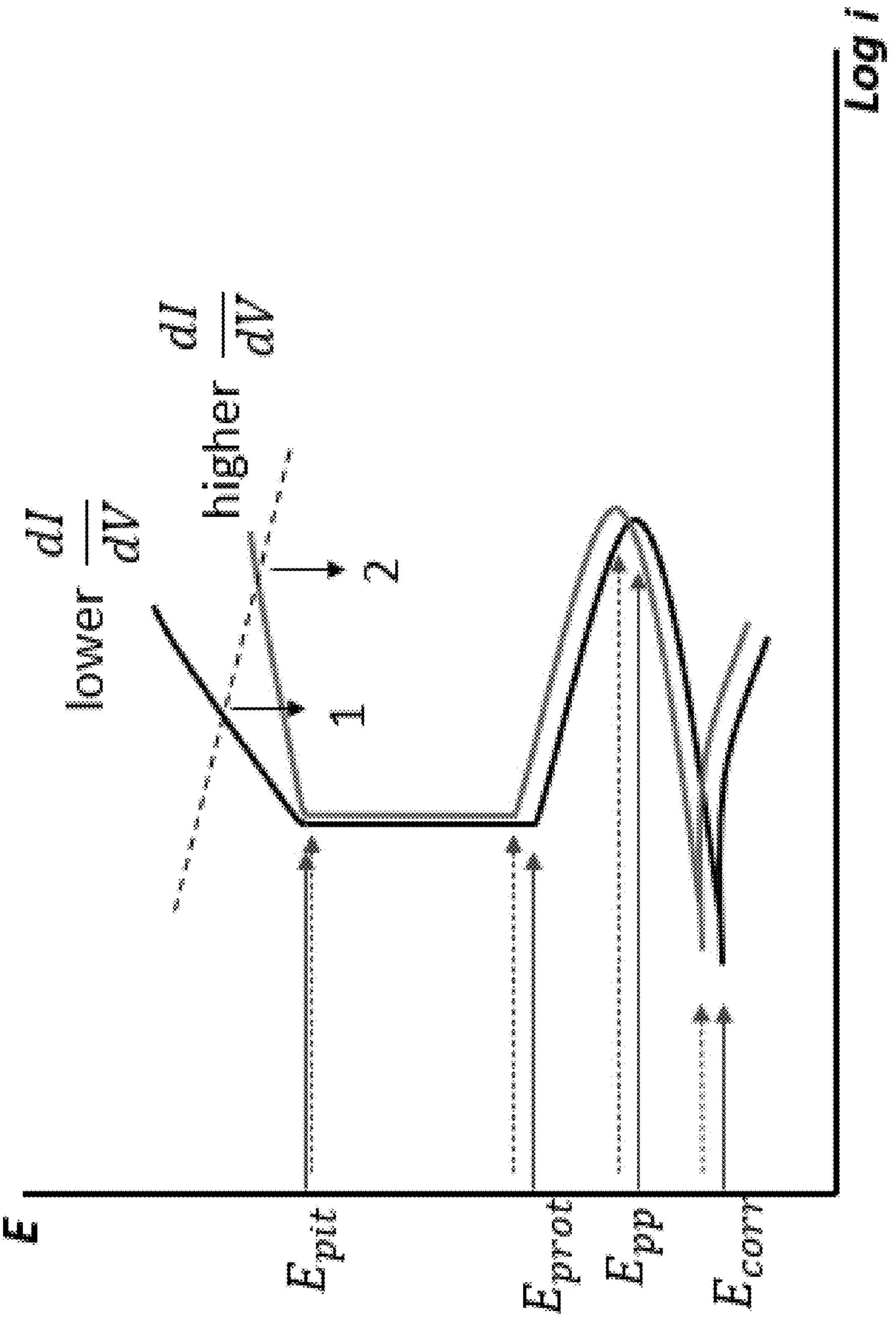
FIG. 6 depicts the definition of the transpassive slope, i.e., the slope for voltages above the inflection current.

FIG. 6 depicts schematically a polarization curve determined for the same alloy but with two different heat treatments, which results in drastically different transpassive slopes. In FIG. 6: "E" is the voltage potential ("E" representing electromotive force, which is more commonly referred to as voltage); "Log i" is the log of the current density (the current that is measured flowing through a sample material divided by the surface area of the sample); "$E_{pit}$" is the pitting ("breakdown") voltage, which occurs at the voltage where the current density significantly increases for a unit increase of applied voltage; "$E_{prot}$" is the passivation (protection) potential; "$E_{pp}$" is the primary passivation potential; "$E_{corr}$" is the corrosion potential; the dotted line represents a reducing reaction where "1" represents a lower current density point due to the smaller slope and "2" represents a higher current density point due to the greater slope; "lower dI/dV" represents the slope above the pitting voltage for one heat treatment technique; and "higher dI/dV" represents the slope above the pitting voltage for the other heat treatment technique; wherein the slope of the curve above the pitting voltage for the "lower dI/dV" is less than the slope of the curve above the pitting voltage for the "higher dI/dV."

FIG. 7 depicts polarization curves for Ni Alloy 718 with various heat treatment schedules: Ni Alloy 718 AR is mill annealed; Ni Alloy 718 SA is 950° C., 1 hour, water quenched; and Ni Alloy 718 AH is 950° C., 1 hour, water quenched, 720° C., 8 hours, furnace cooled at 55° C./hr, held at 650° C., 8 hours, air cooled. Table 2 tabulates the computed dI/dV values reflecting correlations between the transpassive slope, resulting surface roughness and water wetting behavior. Generally, a heat treatment resulting in a higher transpassive slope will have higher quality microfeatures. FIGS. 8A-9B also show how increasing dI/dV trends towards higher density micro features.

TABLE 2

| Material and Heat Treatment | Transpassive slope dI/dV | Surface Roughness (μm) | Water Contact Angle (degrees) |
|---|---|---|---|
| Haynes ® 282 ® AR | 5.60 | 1.59 | 106 |
| Haynes ® 282 ® AH | 11.31 | 8.57 | 111* |
| Ni Alloy 718 Solutionized | 11.51 | 39.26 | 136 |
| Ni Alloy 718 Solution Annealed | 18.80 | 7.54 | 156 |
| Ni Alloy 718 Age Hardened | 4.80 | 0.58 | 104 |

Figure 8A:
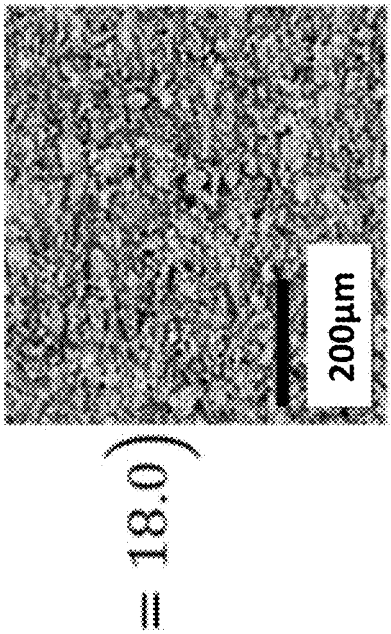
FIG. 8A depicts a micrograph of the topology of solution annealed Ni Alloy 718 resulting from standard etch and electrolyte solution conditions.
Figure 8B:
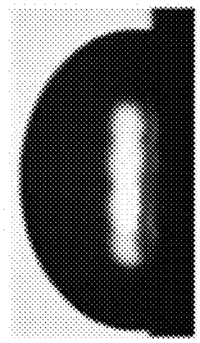
FIG. 8B depicts the contact angle of 10 microliters of JP-8 on the surface of the solution annealed Ni Alloy 718 in FIG. 8A with FAS17 applied.
Figure 9A:
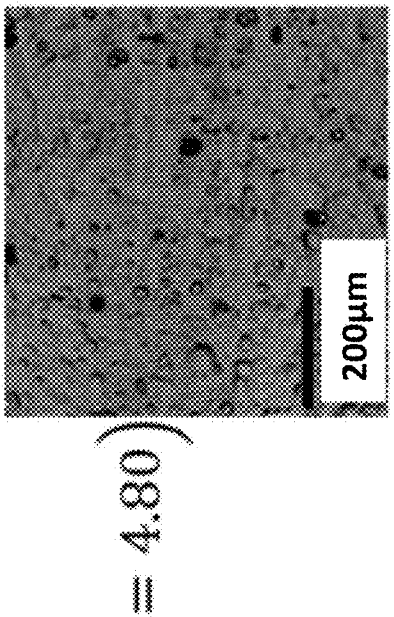
FIG. 9A depicts a micrograph of the topology of age hardened Ni Alloy 718 resulting from standard etch and electrolyte solution conditions.
Figure 9B:
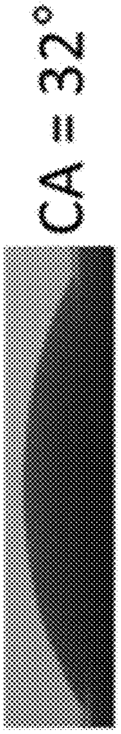
FIG. 9B depicts the contact angle of 10 microliters of JP-8 on the surface of the age hardened Ni Alloy 718 in FIG. 9A with FAS17 applied.

Depicted in FIGS. 8A-8D is an example of the effects of different heat treatment schedules on surface wetting properties. FIG. 8A depicts a micrograph of the topology of solution annealed Ni Alloy 718 resulting from standard etch and electrolyte solution conditions; and FIG. 8B depicts the contact angle of 10 microliters of JP-8 on the surface of the solution annealed Ni Alloy 718 depicted in FIG. 8A with FAS17 applied after the etching process. FIG. 9A depicts a micrograph of the topology of age hardened Ni Alloy 718 (the same alloy as in FIGS. 8A and 8B) resulting from standard etch and electrolyte solution conditions; and FIG. 9B depicts the contact angle of 10 microliters of JP-8 on the surface of the age hardened Ni Alloy 718 depicted in FIG.

9A with FAS17 applied after the etching process. As can be seen by comparing the micrographs in FIGS. 8A and 9A, the etched surfaces are substantially different. And, as can be seen by comparing the depictions (and measurements) of the contact angles in FIGS. 8B and 9B, the contact angles for the same alloy etched using the same technique are very different depending on the heat treatment process to which the alloy was exposed.

By examining the experimental trends the inventors of the present disclosure developed a surface treatment process 100 as depicted in FIG. 10 that produces high density microfeatures on any alloy. The process 100 for surface etching a material produces a surface topology that is conducive to forming a superphilic surface (which may be converted to a superphobic surface by application of an appropriate surface energy reducing compound and/or monolayer) according to embodiments of the present disclosure.

The first step 110 is to determine whether a material that has been subject to (treated with) a precipitation hardening process will be used for the etching process. Both materials that will be hardened by precipitation hardening processes and materials that will not be hardened by precipitation hardening processes may be treated using the apparatuses and processes disclosed herein in order to modify the phobicity/philicity of the surface of the material.

If a material that has not been subject to a precipitation hardening process will be used, then step 140 is next where the PRE for the material will be determined, such as by using Equation 1.

If a material that has been (or will be) subject to a precipitation hardening process will be used, then a determination can be made at step 120 to identify the heat treatment process that is likely to produce the best superphobic or superphilic surface. To make this determination two or more samples of the same material are tested, but each sample was subject to a different heat treatment process. Each sample is tested using an anodic polarization sweep as described above in relation to FIG. 7. Note that FIG. 7 is reproduced in FIG. 10 as an example of conducting the anodic polarization sweep on three samples. During the anodic polarization sweep the anodic overpotential on a work piece sample is increased and the net electrical current leaving the sample is measured and a determination is made of where the pitting ("breakdown") potential occurs for each hardening process. Graphically, the pitting ("breakdown") potential occurs at the voltage where the current density significantly increases for a unit increase of applied voltage. The current density is the current that is measured flowing through the material divided by the surface area of the sample material. The slope of the curve at applied voltages above the pitting potential for each sample is measured. The curve with the shallowest slope (on the voltage vs. current density (dV/dI) plot, which will be the curve with the highest slope on a current density vs. voltage (dI/dV) plot) at applied voltages above the pitting potential indicates the sample and, therefore, the heat treatment technique (which may also be referred to as a heat treatment schedule) that is best suited for the etching process. Once the heat treatment technique is selected at step 130, then the PRE for the material (which is independent of the selected heat treatment technique) is determined at step 140.

The first step is to identify the PRE using the composition or to infer the PRE from the open circuit potential measured during a polarization sweep. Using the PRE, the regime of material being used can be identified, e.g., low (which may be in the range of 0≤PRE≤20), medium (which may be in the range of 20<PRE≤30), and high (which may be in the range of 41≤PRE≤50). The range of 30<PRE<41 between the medium and high regimes in this example was not identified as being in either the medium or high regime since these example regimes were based on data that has been tested and there were no materials tested that fit within the range of 30<PRE<41. As such, with testing the dividing line between the medium and high regimes can be better identified. Nevertheless, at least one additional embodiments includes regimes in which the medium and high ranges abut one another, such as in one example embodiment where the following regimes are used: low (which may be in the range of 0≤PRE≤20), medium (which may be in the range of 20<PRE≤35), and high (which may be in the range of 35<PRE≤50). Other embodiments include two regimes (low and high) covering the range of possible PRE values, while still further embodiments include four or more regimes covering the range of possible PRE values.

For low PRE materials, they will almost certainly need the current to be pulsed to prevent the formation of large, localized pits on the surface. For medium PRE materials a steady low current density is typically sufficient as the surface is intrinsically inclined to produce more uniformly distributed microfeatures. High PRE materials are very unlikely to produce microfeatures as they are highly resilient to localized attack. In general, very low currents less than 30 milliamps per square centimeter sustained for durations longer than 8 hours have been most effective at adding surface roughness. If multiple heat treatments are available as options, the dI/dV obtained from polarization sweeps are used to determine the favorable treatment. FIG. 10 provides a flowchart for the logic used as a starting point in an etch recipe.

Embodiments of the present disclosure produce etches utilizing the general process(es) depicted in FIG. 10 that are capable of making superhydrophobic microfeatures on Ni Alloy 718, SS304, and Haynes 282. Additional embodiments utilizing the general process(es) depicted in FIG. 10 produce microfeatures with improved phobicity for Ni Alloy 600 and Ni Alloy 625. Table 3 below includes etching recipes and their associated performances according to embodiments of the present disclosure.

TABLE 3

| Material | PRE | Current Density ($mA/cm^2$) | Duty Factor | CA JP-8 |
|---|---|---|---|---|
| Ni Alloy 600 | 15.5 | 160 | ⅓ | 75 |
| SS304 | 19 | 160 | ⅓ | 78 |
| Ni Alloy 718 | 28.5 | 30 | 1 | 90 |
| Haynes 282 | 47.7 | 1000 | ⅓ | 71 |
| Ni Alloy 625 | 49.1 | 3 | 1 | 66 |

Once the material is electrochemically etched, a molecular layer of a surface energy-reducing compound (which may also be referred to as a surface free energy reducing compound and may optionally be a non-polar substance and/or a substance that is self-assembling) can be applied to enable a superphobic surface. In at least one embodiment the compound is Perfluorodecyltriethoxysilane or "FAS17". This technique can be used, for example, in creating the surfaces that are the subject of FIGS. 8A-9B. With many metal alloys, the etching alone results in a philic or superphilic surface that is readily wetted when liquid is applied. However, application of FAS17 frequently results in the philic surface becoming phobic, e.g., a superphilic etched surface becoming superphobic. Moreover, careful application or removal of the FAS17 can produce adjacent regions of superphobicity and superphilicity enabling passive wetting control.

Figure 11:
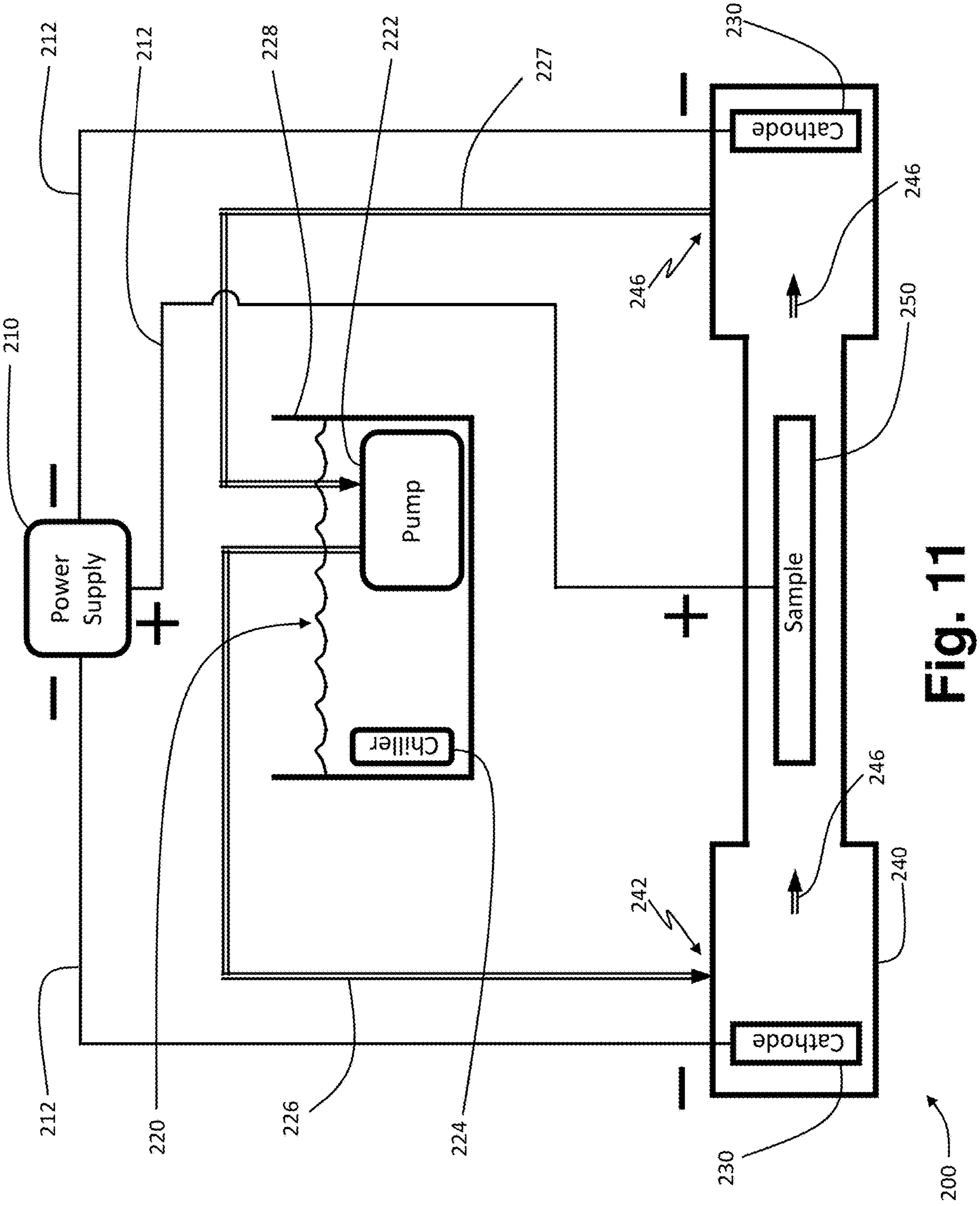
FIG. 11 is a graphical depiction of a "wireless" cathode surface treatment device and system according to embodiments of the present disclosure.

Many of the applications of interest for superphobicity include enclosed passages with complex flow paths. For straight tubing with relatively large inner diameters, it is possible to route a concentric wire to act as the counter electrode. Keeping the counter electrode equidistant to the working electrode keep current density uniform while also reducing losses due to ohmic heating of the electrolyte solution. However, as the internal diameter gets near 1 mm or smaller this becomes increasingly impractical. One method for counteracting this is to move the counter outside of the internal passage. However, disparities in the length for the current pathway between the working and counter electrode will affect the current density distribution. To mitigate this, the counter electrode can be moved further away to make the relative effects less significant. Increasing the current pathways comes with a power and heating penalty. For relatively small treatment areas, a high voltage power supply, in-line filtration, and electrolyte solution heat exchanger can counteract these challenges. FIG. 11 provides a visualization of this "wireless" electrode configuration and its effects on current density distribution.

Depicted in FIG. 11 is a surface treatment system 200 according to at least one embodiment of the present disclosure. Surface treatment system 200 includes a power supply 210 that maintains a voltage differential between one or more cathodes 230 and a sample 250 being treated. Electrical wires 212 connect the positive terminal of the power supply 210 to the sample 250, and connect the negative terminal(s) of the power supply 210 to the one or more cathodes 230. The sample chamber 240 contains electrolyte 220, and the sample 250 and cathodes 230 are positioned within the electrolyte 220 within the sample chamber 240. In embodiments where the electrolyte 220 is actively circulated through and/or around the sample 250 (in contrast to embodiments where the electrolyte 220 is not actively circulated), a pump 222 may be used to circulate the electrolyte 220 from a reservoir 228, via a supply conduit (pipe 226) to an inlet 242 of the sample chamber 240, through the sample chamber 240, through and/or around the sample 250, to a return conduit (pipe 227) at the outlet 246 of the sample chamber 240, and back to the reservoir through the return pipe 227.

As depicted in FIG. 11, when using the wireless cathode system (which may be due to the central passage in the sample being too small for a wire cathode or being bent so that it is impractical to have a central wire cathode), the cathodes should be positioned away from the sample tube to produce uniform etching. Placing the cathodes near the sample result in uneven etching along the length of the sample.

An optional chiller 224 may be used to control the temperature of the electrolyte 220, such as to cool the electrolyte 220 as it is heated while circulating round the sample 250. The direction that the electrolyte 220 flows through the sample changer 240 is depicted with flow direction arrows 246.

Figure 12:
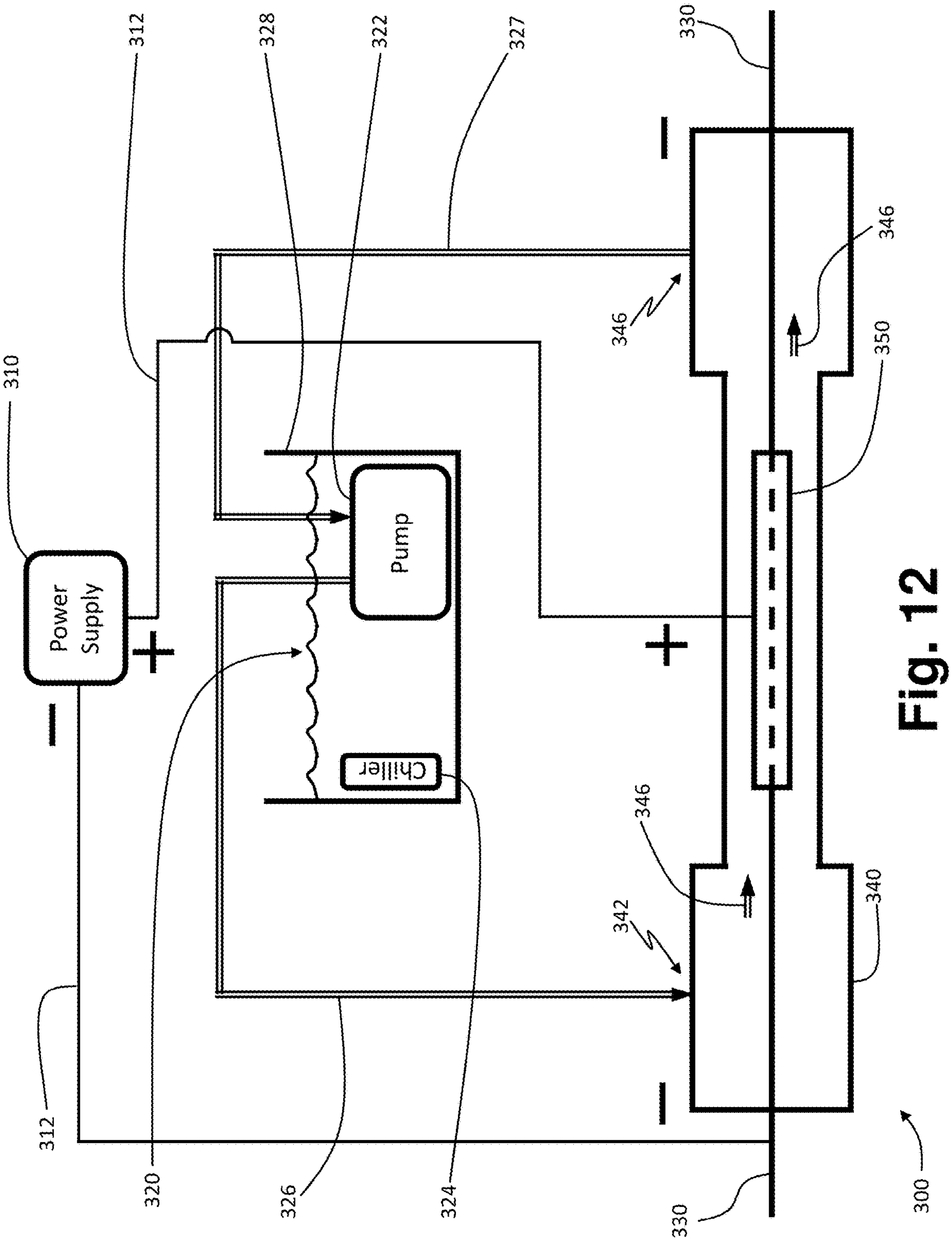
FIG. 12 is a graphical depiction of a "wired" cathode surface treatment device and system according to additional embodiments of the present disclosure.

Depicted in FIG. 12 is a surface treatment system 300 according to at least one additional embodiment of the present disclosure. Surface treatment system 300 includes a power supply 310 that maintains a voltage differential between a cathode 330 and a sample 350 being treated. In this embodiments sample 350 is shaped as a hollow cylinder (tube) and cathode 330 is positioned within the interior volume of sample 350, and optionally on the central axis of sample 350. The dashed line of cathode 330 is intended to depict its position within the sample 350. By positioning the cathode 130 inside the sample 350, the ability to control the surface treatment on the interior surface of the sample 350 is enhanced, which can have benefits when treating samples through which a fluid will flow, such as a fuel line for an engine.

Electrical wires 312 connect the positive terminal of the power supply 310 to the sample 350, and connect the negative terminal of the power supply 310 to the central cathode 330. The sample chamber 340 contains electrolyte 320, and the sample 350 and cathode 330 are positioned within the electrolyte 320 within the sample chamber 340. In embodiments where the electrolyte 320 is actively circulated through and/or around the sample 350 (in contrast to embodiments where the electrolyte 120 is not actively circulated), a pump 322 may be used to circulate the electrolyte 320 from a reservoir 328, via a supply conduit (pipe 326) to an inlet 342 of the sample chamber 340, through the sample chamber 340, through and/or around the sample 350, to a return conduit (pipe 327) at the outlet 346 of the sample chamber 340, and back to the reservoir through the return pipe 327.

An optional chiller 324 may be used to control the temperature of the electrolyte 320, such as to cool the electrolyte 320 as it is heated while circulating round the sample 350. The direction that the electrolyte 320 flows through the sample changer 340 is depicted with flow direction arrows 346.

The term "Ni Alloy" is used herein to refer to various nickel alloy metals. The number that follows "Ni Alloy" refers to the specific composition serial number of the alloy. Frequently individuals will use the term "Inconel®" in place of "Ni Alloy" when referring to the specific metal, although the term "Inconel®" (abbreviated as "IN®") is a registered trademark. For example, users will typically refer to "Ni Alloy 718" as either "Inconel® 718" or "IN® 718" when referring to this particular metal alloy.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

To clarify the use of and to hereby provide notice to the public, the phrases "at least one of A, B, . . . and N" or "at least one of A, B, N, or combinations thereof" or "A, B, . . . and/or N" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. As one example, "A, B and/or C" indicates that all of the following are contemplated: "A alone," "B alone," "C alone," "A and B together," "A and C together," "B and C together," and "A, B and C together." If the order of the items matters, then the term "and/or" combines items that can be taken separately or together in any order. For example, "A, B and/or C" indicates that all of the following are contemplated: "A alone," "B alone," "C alone," "A and B together," "B and A together," "A and C together," "C and A together," "B and C together," "C and B together," "A, B and C together," "A, C and B together," "B, A and C together," "B, C and A together," "C, A and B together," and "C, B and A together."

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used or applied in combination with some or all of the features of other embodiments unless otherwise indicated. One or more exemplary embodiments have been shown and described, and all changes and modifications that come within the spirit of the disclosure are desired to be protected.

Element Numbering

Table 1 includes element numbers and at least one word used to describe the element and/or feature represented by the element number. However, none of the embodiments disclosed herein are limited to these descriptions. Other words may be used in the description or claims to describe a similar member and/or feature, and these element numbers can be described by other words that would be understood by a person of ordinary skill reading and reviewing this disclosure in its entirety.

TABLE 4

| | |
|---|---|
| 100 | Surface treatment process |
| 110 | Step-Will hardened material be treated with process? |
| 120 | Step-Determine which hardening process is preferred. |
| 130 | Step-Select (or treat) material with preferred hardening process. |
| 140 | Step-Determine PRE of material. |
| 150 | Step-Use this process if PRE is "low." |
| 152 | Image of material before surface treatment. |
| 155 | Step-Surface treatment process. |
| 157 | Image of material after surface treatment. |
| 159 | Depiction of contact angle after process. |
| 160 | Step-Use this process if PRE is "medium." |
| 162 | Image of material before surface treatment. |
| 165 | Step-Surface treatment process. |
| 167 | Image of material after surface treatment. |
| 169 | Depiction of contact angle after process. |
| 170 | Step-Use this process if PRE is "high." |
| 172 | Image of material before surface treatment. |
| 175 | Step-Surface treatment process. |
| 177 | Image of material after surface treatment. |
| 179 | Depiction of contact angle after process. |
| 200 | Surface treatment system |
| 210 | Power supply |
| 212 | Electrical wire |
| 220 | Electrolyte |
| 222 | Pump |
| 224 | Chiller |
| 226 | Conduit (pipe) |
| 228 | Reservoir |
| 230 | Cathode |
| 240 | Sample chamber |
| 242 | Inlet |
| 244 | Outlet |
| 246 | Flow direction |
| 250 | Sample |
| 300 | Surface treatment system |
| 310 | Power supply |
| 312 | Electrical wire |
| 320 | Electrolyte |
| 322 | Pump |
| 324 | Chiller |
| 326 | Conduit (pipe) |

TABLE 4-continued

| | |
|---|---|
| 328 | Reservoir |
| 330 | Cathode |
| 340 | Sample chamber |
| 342 | Inlet |
| 344 | Outlet |
| 346 | Flow direction |
| 250 | Sample |

What is claimed is:

1. A method for selecting a heat treatment technique for use in treating the surface of a material to increase the manner in which a liquid interacts with the surface of the material, the method comprising:

obtaining two or more samples of a material, each of the two or more samples having been subject to a precipitation hardening process, each sample having been subject to a different precipitation hardening process than the precipitation hardening process used on the other of the two or more samples;

applying a current to each of the two or more samples;

increasing the voltage applied to each of the two or more samples;

measuring the current across each of the two or more samples while increasing the voltage being applied to each of the two or more samples;

determining the pitting voltage for each sample, wherein the pitting voltage is the voltage at which the current density increases for a unit increase of applied voltage resulting in an identifiable change in the slope of the current density vs. voltage (dI/dV) and the current density is the current that is measured flowing through the sample material divided by the surface area of the sample material;

measuring the slope of current density vs. voltage at voltages above the pitting voltage for each sample;

determining the sample with the largest slope of current density vs. voltage at voltages above the pitting voltage;

selecting the heat treatment technique associated with the sample with the largest slope of current density vs. voltage at voltages above the pitting voltage for use in treating the surface of a material.

2. The method of claim 1, further comprising:

obtaining a work piece of material to be etched, wherein the work piece has been treated using the selected heat treatment technique;

determining the non-dimensional pitting resistance equivalence number (PRE) of the work piece;

placing the work piece in an electrolyte;

placing an electrode in the electrolyte;

applying an electrical voltage potential between the work piece and the electrode; and if the PRE of the work piece is 20 or less, etching the surface of the work piece by applying a pulsed current of at least 150 milliamps per square centimeter ($mA/cm^2$) of the surface to be etched more than 20 and at most 35, etching the surface of the work piece by applying a steady current of at least 20 milliamps per square centimeter ($mA/cm^2$) and at most 100 milliamps per square centimeter ($mA/cm^2$); or more than 35, etching the surface of the work piece by applying a steady current of at most 3 milliamps per square centimeter ($mA/cm^2$).

3. The method of claim 2, further comprising:
flowing the electrolyte across the work piece.

4. The method of claim 2, wherein determining the non-dimensional pitting resistance equivalence number (PRE) of the work piece is calculated using PRE=Cr+(3.3*Mo)+(16*N)+(0.5*W)

where Cr is the percentage by weight of chromium in the work piece material, Mo is the percentage by weight of molybdenum in the work piece material, N is the percentage by weight of nitrogen in the work piece material, and W is the percentage by weight of tungsten in the work piece material.

5. The method of claim 2, wherein the electrical voltage potential is applied in a manner resulting in the work piece functioning as an anode and the electrode functioning as a cathode.

6. The method of claim 2, wherein the work piece defines a hollow cylindrical tube and the electrode is positioned inside the hollow cylindrical tube.

7. The method of claim 2, wherein said placing an electrode in the electrolyte includes placing two electrodes in the electrolyte with the work piece positioned between the two electrodes.

8. The method of claim 2, further comprising:
flowing the electrolyte across the work piece;
wherein
determining the non-dimensional pitting resistance equivalence number (PRE) of the work piece is calculated using PRE=Cr+(3.3*Mo)+(16*N)+(0.5*W)

where Cr is the percentage by weight of chromium in the work piece material, Mo is the percentage by weight of molybdenum in the work piece material, N is the percentage by weight of nitrogen in the work piece material, and W is the percentage by weight of tungsten in the work piece material; and
the electrical voltage potential is applied in a manner resulting in the work piece functioning as an anode and the electrode functioning as a cathode.

9. The method of claim 8, wherein the work piece defines a hollow cylindrical tube and the electrode is positioned inside the hollow cylindrical tube.

10. The method of claim 8, wherein said placing an electrode in the electrolyte includes placing two electrodes in the electrolyte with the work piece positioned between the two electrodes.

11. The method of claim 1, further comprising:
applying a molecular layer of a surface energy-reducing compound.

12. The method of claim 11, wherein the coating follows the microscale topology of the etched surface.

13. The method of claim 11, wherein the molecular layer includes a non-polar material.

14. The method of claim 13, wherein molecular layer includes a perfluoroalkyl or polyfluoroalkyl substance (PFAS).

* * * * *